Patented Sept. 12, 1944

2,358,069

UNITED STATES PATENT OFFICE 2,358,069

CLARIFICATION OF CELLULOSE ESTER ACID DOPES

William B. Hincke, Kingsport, Tenn., assignor to Eastman Kodak Company, Rochester, N. Y., a corporation of New Jersey No Drawing. Application October 8, 1942, Serial No. 461,358

4 Claims. (Cl. 252—142)

This invention relates to a method of clarifying solutions of organic acid esters of cellulose of an acid nature such as result from the esterification of cellulose with a lower fatty acid anhydride.

In recent years the matter of clarity of cellulose ester solutions has been of interest. In the manufacture of lower fatty acid esters of cellulose undissolved particles have often been present in the product which particles interfere with good clarity in the resulting ester. The use of various screening and filtering means has suggested itself but due to the difficulties involved in cleaning, adoption of filtering to clarify cellulose ester dopes has been slow, if at all.

One object of my invention is to provide a method of cleaning the filters employed to clarify cellulose ester solutions or "dopes" which readily accomplishes removal of the particles which clog those filters without carbonizing those particles or otherwise affecting the filtering properties of the filter. Other objects will appear herein.

I have found a means of overcoming the chief difficulty of using a filter to clarify acid solutions or dopes of lower fatty acid esters of cellulose, namely that those filters are difficult to clean after they become plugged in this filtering operation. I have found that such a plugged filter is effectively cleaned by treating with acetic anhydride containing a small proportion of sulfuric acid, preferably at an elevated temperature.

My invention is adapted to the cleaning of any type of filter which would be employed for the removal of particles from the acid dopes or spent esterification masses resulting from the preparing of lower fatty acid esters of cellulose. For instance, in the preparation of a lower fatty acid ester of cellulose, the cellulose is ordinarily reacted upon with a lower fatty acid anhydride such as of acetic, propionic or butyric or their mixture in the presence of a sulfuric acid catalyst. Unless the reaction is allowed to continue to such a point that the cellulose ester is detrimentally affected or the viscosity is unduly lowered there will usually be gel particles or fibrous particles present in the dope which is obtained. If the cellulose ester is then directly esterified without removing those particles, a product is obtained which does not dissolve in a volatile solvent to a brilliantly clear dope such as is desirable in use. Therefore, before precipitating the cellulose ester, it is desirable to subject the completed reaction mass containing the cellulose ester in solution to some treatment to remove any particles which have not dissolved in the liquid of the esterification mass. This may be done by passing the completed reaction mass through a filter or through a centrifuge having a screening element. Some of the types of filters which may be employed are, for instance, those of porous Carborundum or Alundum having a porosity of 2 to 60 on the air dry scale, porous glass filters, permanent sand filters in which the fine sand bed is not disturbed when cleaning and sand bed filters in which the sand may be agitated. If centrifuging is employed, a multi-cone supercentrifuge may be employed.

My invention comprises subjecting one of these filter elements after it has become plugged or deposits have formed thereon with a mixture of acetic anhydride and a small amount of catalyst which treatment for a time removes the deposit or plugging material therefrom. Ordinarily, the acetic anhydride is diluted with acetic acid although this is not necessary but is merely a matter of economy. The sulfuric acid concentration of the cleaning liquid is ordinarily between 1 and 10%. Ordinarily the treatment is applied by circulating the cleaning liquid through the filtering elements in such a manner that the particles plugging the filter are dissolved by the cleaning solution but yet charring or carbonizing of those particles is avoided.

It is preferred to carry out the cleaning of filters by means of acetic anhydride and sulfuric acid at an elevated temperature such as above 120° F. but below the point at which any appreciable or excessive charring occurs. It is preferable to limit the upper temperature of treatment to not more than 160° F. if the operator is to be assured that no appreciable charring occurs within the limits of the range of sulfuric acid concentration given. This is especially true with a cleaning liquid in which 10% of sulfuric acid is present. The upper limit which may be used, however, depends upon the sulfuric acid concentration in the cleaning liquid. For instance, with a cleaning liquid containing approximately 1% sulphuric acid, a temperature up to 200° F. might be employed without causing excessive charring of any of the particles which are removed from the filter. The principal advantage of the elevated temperature is the saving in time. For instance, if a Carborundum stone filter of from 2 to 60 porosity is to be cleaned, it can be satisfactorily cleared of any plugging material or gel particles by circulating acetic anhydride therethrough containing a proportion of sulfuric acid within the range given for 10 to 45 minutes at 150° F. This same treatment using room temperature would require from 4 to 24 hours depending upon the amount of material which it is necessary to remove from the filter. As a 5% concentration of sulfuric acid is quite suitable for this purpose, in actual operations it would be preferable to run through the filter, cleaning liquid having that concentration and at a temperature of 150° F. until the filter has been effectively cleaned. If the cleaning liquid is somewhat affected by the material which is removed from the filtering material, it may be desirable to run a small amount of acetic acid through the filter to complete the cleaning operation. It is to be understood, however, that my invention is not limited to the example given but may be varied in accordance with the desires of the individual operator.

Not only is my invention designed to clean stone, glass and sand filters, but also it may be employed to clean the bowl of a centrifuge through which a cellulose ester solution has been passed without taking the centrifuge apart. For instance, the centrifuge may be cleaned of fibers and particles even without stopping the centrifuge by simply turning off the unclarified dope feed and passing a small amount of cleaning solution through instead followed by a small rinse with acetic acid. It is desirable to perform this cleaning before the fiber and gel particles have built up a deposit which is so thick that it is difficult for the cleaning solution to penetrate therethrough. Otherwise, the cleaning is not as rapid as it might be. It is desired in the cleaning processing that sufficient cleaning solution be employed so that continual circulation of the cleaning solution may be employed.

As pointed out before, the cleaning solution may consist entirely of acetic anhydride and sulfuric acid or, if desired, some diluent may be present therein such as acetic acid. As too great a dilution of the acetic anhydride will interfere with the effectiveness of the cleaning solution, it is desirable that the cleaning solution contain at least 20% of acetic anhydride. As an alternative method of cleaning filters, particularly stone filters or filters of porous glass, the material may be merely wetted with the hot cleaning solution and allowed to stand for a few hours so as to convert the particles plugging the filter material into a form in which they will readily dissolve followed by washing or flushing the filter material with a small amount of glacial acetic acid so as to dissolve and remove the plugging material.

Although the examples given herein specify the use of sulfuric acid along with the acid anhydride to clean filters, other compounds having a similar action may be used for this purpose in like proportions. For instance, compounds such as phosphoric acid, zinc chloride, perchloric acid, or compounds which have been employed as catalysts in cellulose acetylation, may be mixed with acetic anhydride to form a cleaning solution for use in the method of my invention.

I claim:

1. A method of cleaning a filter employed for the filtration of cellulose ester solutions, which comprises treating a filtering material inorganic in character, and resistant to the action of acids and acid anhydrides which material is clogged with gel and fibrous particles filtered out of a cellulose ester dope, with an anhydrous cleaning solution containing at least 20% of acetic anhydride and 1-10% of a cellulose acetylation catalyst.

2. A method of cleaning a filter employed for the filtration of cellulose ester solutions, which comprises treating a filtering material inorganic in character, and resistant to the action of acids and acid anhydrides, which material is clogged with gel and fibrous particles filtered out of a cellulose ester dope, with an anhydrous cleaning solution containing at least 20% of acetic anhydride and 1-10% of sulfuric acid.

3. A method of cleaning a filter employed for the filtration of cellulose ester solutions which comprises treating a filtering material inorganic in character, and resistant to the action of acids and acid anhydrides, which material is clogged with gel and fibrous particles filtered out of a cellulose ester dope, with a cleaning solution consisting of acetic anhydride containing 1-10% of sulfuric acid.

4. A method of cleaning a porous stone filter which is chemically inert to acids and acid anhydrides which comprises treating a porous stone filtering material clogged with gel and fibrous particles filtered out of a cellulose ester dope with an anhydrous cleaning solution containing at least 20% of acetic anhydride and 1-10% of sulfuric acid.

WILLIAM B. HINCKE.